United States Patent
Brown

(10) Patent No.: US 11,323,250 B2
(45) Date of Patent: *May 3, 2022

(54) METHOD AND SYSTEM FOR KEY AGREEMENT UTILIZING SEMIGROUPS

(71) Applicant: BlackBerry Limited, Waterloo (CA)

(72) Inventor: Daniel Richard L. Brown, Mississauga (CA)

(73) Assignee: BlackBerry Limited, Waterloo (CA)

( * ) Notice: Subject to any disclaimer, the term of this patent is extended or adjusted under 35 U.S.C. 154(b) by 177 days.

This patent is subject to a terminal disclaimer.

(21) Appl. No.: 16/836,377

(22) Filed: Mar. 31, 2020

(65) Prior Publication Data

US 2020/0228328 A1 Jul. 16, 2020

Related U.S. Application Data

(63) Continuation of application No. 15/824,398, filed on Nov. 28, 2017, now Pat. No. 10,637,656.

(51) Int. Cl.

| H04L 9/08 | (2006.01) |
| H04L 9/30 | (2006.01) |
| G06F 17/10 | (2006.01) |
| H04L 9/06 | (2006.01) |

(52) U.S. Cl.
CPC ............ H04L 9/0841 (2013.01); G06F 17/10 (2013.01); H04L 9/0656 (2013.01); H04L 9/30 (2013.01)

(58) Field of Classification Search
CPC ....... H04L 9/0841; H04L 9/0656; H04L 9/30; G06F 17/10
See application file for complete search history.

(56) References Cited

U.S. PATENT DOCUMENTS

| 8,549,299 B2* | 10/2013 | Struik | H04L 9/0844 713/171 |
| 8,707,042 B2* | 4/2014 | Schneider | H04L 9/3026 713/171 |
| 2003/0059043 A1* | 3/2003 | Okeya | G06F 7/725 380/30 |
| 2004/0114760 A1* | 6/2004 | Brown | G06F 7/725 380/255 |

(Continued)

OTHER PUBLICATIONS

Berenstein et al., "Geometric Key Establishment", Sep. 12, 2004, 20 pages. (Year: 2014).*

(Continued)

*Primary Examiner* — Yonas A Bayou
(74) *Attorney, Agent, or Firm* — Moffat & Co

(57) ABSTRACT

A method for key agreement between a first party and a second party over a public communications channel, the method including selecting, by the first party, from a semigroup, a first value "a"; multiplying the first value "a" by a second value "b" to create a third value "d", the second value "b" being selected from the semigroup; sending the third value "d" to the second party; receiving, from the second party, a fourth value "e", the fourth value comprising the second value "b" multiplied by a fifth value "c" selected by the second party from the semigroup; and creating a shared secret by multiplying the first value "a" with the fourth value "e", wherein the shared secret matches the third value "d" multiplied by the fifth value "c".

21 Claims, 7 Drawing Sheets

(56) References Cited

U.S. PATENT DOCUMENTS

| | | | |
|---|---|---|---|
| 2004/0158597 A1* | 8/2004 | Ye | G06F 7/725 708/492 |
| 2005/0213758 A1* | 9/2005 | Lenstra | H04L 9/0841 380/44 |
| 2006/0029222 A1* | 2/2006 | Lambert | H04L 9/3073 380/28 |
| 2006/0036861 A1* | 2/2006 | Chernyak | H04L 9/0841 713/171 |
| 2008/0056490 A1* | 3/2008 | Akishita | H04L 9/0631 380/44 |
| 2008/0069344 A1* | 3/2008 | Yao | H04L 9/0844 380/44 |
| 2009/0006512 A1* | 1/2009 | Ozturk | G06F 7/724 708/205 |
| 2009/0052657 A1* | 2/2009 | Golic | G06F 7/725 380/28 |
| 2010/0020965 A1* | 1/2010 | Gueron | H04L 9/3066 380/44 |

OTHER PUBLICATIONS

Extended European Search report dated Oct. 8, 2020, on European Application No. 21197552.9.

Muhammad Rabi and Alan T. Sherman, "Associative One-Way Functions: A New Paradigm for Secret-Key Agreement and Digital Signatures", published at https://citeseerx.ist.psu.edu/viewdoc/download?doi=10.1.1.118.6837&rep=rep1&type=pdf, Nov. 15, 1993.

International Searching Authority, International Search Report and Written Opinion for International Application No. PCT/CA2018/051503, dated Feb. 18, 2019.

Berenstein, Arkady et al., "Geometric Key Establishment", Canadian Mathematical Society conference, Dec. 9, 2004, pp. 1-19.

Wang, Yongchuan et al., "Secret Key Sharing Scheme Based on the Theory of Algebraic Semigroups", Journal of Electronics, Jul. 2000, vol. 17, Issue 3, pp. 238-241.

Arkady Berenstein: "Geometric Key Establishment", Canadian Mathematical Society conference; Dec. 9, 2004, pp. 1-19, XP055616407.

Yongchuan Wang et al: "Secret Key Sharing Scheme based on the Theory of Algebraic Semigroups", Journal of Electronics (China), SP Science Press, Heidelberg, vol. 17, No. 3, pp. 238-241, Jun. 30, 2000.

Extended European Search report dated Aug. 14, 2020, on European Application No. 18882393.4.

Examination Report from the Indian Intellectual Property office, dated Mar. 17, 2022, for Indian Patent Application No. 202047025538.

* cited by examiner

METHOD AND SYSTEM FOR KEY AGREEMENT UTILIZING SEMIGROUPS

FIELD OF THE DISCLOSURE

The present disclosure relates to cryptography, and in particular relates to key agreement for cryptography.

BACKGROUND

In cryptography, key agreement schemes define a set of rules for how two parties may each choose a secret, and then compute a shared secret based on such choice. Key agreement schemes are sometimes referred to as key exchange or key establishment schemes.

The most famous form of key agreement is referred to as the Diffie-Hellman (DH) key agreement. Various forms of Diffie-Hellman key agreements exist, including elliptical curve forms, which are commonly used on many websites.

However, quantum computers are emerging as a potential computing platform. Quantum computers use "quantum bits" rather than binary digits utilized in traditional computers. Such quantum computers would theoretically be able to solve certain problems much more quickly than classical computers, including integer factorization, which is the strength behind the Diffie-Hellman key agreement scheme.

In particular, Peter Shor formulated Shor's quantum algorithm in 1994. This algorithm is known to attack the Diffie-Hellman key agreement if a sufficiently powerful quantum computer can be built. Utilizing such algorithm, the risk of a quantum computer discovering the secret for one or both parties in a Diffie Hellman key agreement scheme is nonzero. Therefore, counter measures to Shor's algorithm are needed.

BRIEF DESCRIPTION OF THE DRAWINGS

The present disclosure will be better understood with reference to the drawings, in which.

DETAILED DESCRIPTION OF THE DRAWINGS

Figure 1:
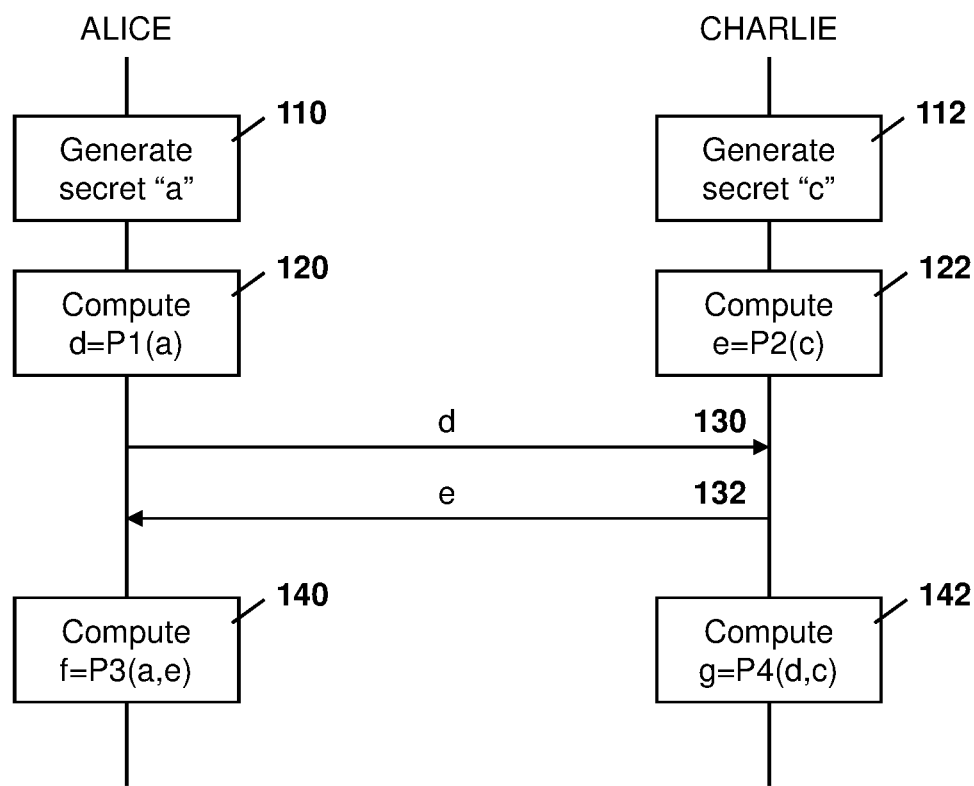
FIG. 1 is a dataflow diagram showing a key agreement scheme.

The present disclosure provides a method for key agreement between a first party and a second party over a public communications channel, the method comprising: selecting, by the first party, from a semigroup, a first value "a"; multiplying the first value "a" by a second value "b" to create a third value "d", the second value "b" being selected from the semigroup; sending the third value "d" to the second party; receiving, from the second party, a fourth value "e", the fourth value comprising the second value "b" multiplied by a fifth value "c" selected by the second party from the semigroup; and creating a shared secret by multiplying the first value "a" with the fourth value "e", wherein the shared secret matches the third value "d" multiplied by the fifth value "c".

The present disclosure further provides a computing device configured for key agreement between a first party and a second party over a public communications channel, the computing device comprising: a processor; and a communications subsystem, wherein the computing device is configured to: select, from a semigroup, a first value "a"; multiply the first value "a" by a second value "b" to create a third value "d", the second value "b" being selected from the semigroup; send the third value "d" to the second party; receive, from the second party, a fourth value "e", the fourth value comprising the second value "b" multiplied by a fifth value "c" selected by the second party from the semigroup; and create a shared secret by multiplying the first value "a" with the fourth value "e", wherein the shared secret matches the third value "d" multiplied by the fifth value "c".

The present disclosure further provides a computer readable medium for storing instruction code for key agreement between a first party and a second party over a public communications channel, the instruction code, when executed by a processor of a computing device cause the computing device to: select, from a semigroup, a first value "a"; multiply the first value "a" by a second value "b" to create a third value "d", the second value "b" being selected from the semigroup; send the third value "d" to the second party; receive, from the second party, a fourth value "e", the fourth value comprising the second value "b" multiplied by a fifth value "c" selected by the second party from the semigroup; and create a shared secret by multiplying the first value "a" with the fourth value "e", wherein the shared secret matches the third value "d" multiplied by the fifth value "c".

In accordance with the present disclosure, semigroups, which are a category of mathematical objects in algebra, may be used as a basis for key agreement schemes. Any semigroup may be used as the basis for a key agreement scheme, and further the new construction allows for any key agreement scheme to be constructed in this way, including existing schemes such as the Diffie-Hellman key agreement, and the Supersingular Isogeny Diffie-Hellman (SIDH) key agreement scheme.

However, not all semigroups are appropriate for key agreement schemes. Therefore, in accordance with some embodiments of the present disclosure, a choice of semigroups may be limited for key agreement based on various characteristics of the semigroup. In particular, structurally secure semigroups may be defined based on either trial elimination or restriction. Restriction can occur based on characteristics of the semigroup.

In a further embodiment the present disclosure, semigroups may be constructed using building blocks such as other semigroups or other types of algebraic objects, including semirings or arbitrary functions. Such construction may enhance the security of a key agreement scheme.

In a further embodiment of the present disclosure, the use of a particular semigroup may be negotiated between the parties to the key agreement scheme. This may allow for cryptoagility and security by obscurity through the selection of one of many semigroup key agreement schemes to utilize for a particular transaction.

These and other aspects are described below.

Key Agreement

In key agreement schemes, two parties wish to create a secure communication utilizing a secret key, where both parties have made a contribution to such secret key.

Reference is made to FIG. 1, which shows a generalized key agreement scheme between two parties. In particular, in the embodiment of FIG. 1, two parties, namely Alice and Charlie in the embodiment of the present disclosure, are the parties that are participating in the key agreement scheme.

In the embodiment of FIG. 1, Alice generates a secret "a", as seen at block 110. Similarly, Charlie generates a secret "c", as seen at block 112.

Based on the generated secret "a" at block 110, Alice then computes a value "d" utilizing an algorithm P1 and the secret "a", as seen at block 120.

Similarly, Charlie computes a value "e" utilizing an algorithm P2 and the secret "c", as shown at block 122.

Alice then delivers the value "d" to Charlie, as shown by message 130. Similarly, Charlie delivers the value "e" in message 132 to Alice. For both messages 130 and 132, delivery is considered to be reliable and authenticated using some mechanism.

Based on the receipt of value "e", Alice may then compute a value "f" utilizing an algorithm P3, the generated secret "a" from block 110, and the received public value "e" from message 132, as seen at block 140.

Similarly, Charlie may compute a value "g" using an algorithm P4 with the secret generated at block 112, along with the value "d" received at message 130, as shown at block 142.

The computations used in the key agreement are such that f=g using algorithm P4, and therefore Alice and Charlie now share a secret, namely f=g. Such shared secret has contributions by both parties.

Such shared secret may then be used, for example, as a symmetric key for both encryption and authentication of content and messages in future communications.

The embodiment of FIG. 1 describes an asynchronous key agreement scheme, which provides a set of rules on how Alice and Charlie choose their secrets "a" and "c", and how they can compute the values d, e, f, g. Such schemes are sometimes called key exchange, to reflect the fact that public values d and e are exchanged. Similarly, they are sometimes called key distribution or key establishment. However, in accordance with the present disclosure, the term key agreement is typically used below to describe the fact that both parties contribute to the shared secret.

While the embodiment of FIG. 1 above describes a key agreement scheme in which the keys of one party are not dependent on the other, in other cases, communications may need to be synchronized and ordered. For example, if the embodiment of FIG. 1 was modified to make Charlie's public value "e" depend on Alice's public value "d", then Charlie would not be able to send "e" until "d" had been received. In this case, the model may not be considered to be asynchronous.

However, in the embodiments described below, all key agreement schemes are asynchronous. One example of such asynchronous scheme may be the Internet Engineering Task Force (IETF) protocol Transport Layer Security (TLS), which protects the HyperText Transport Protocol Secure (HTTPS) connections between clients and servers. The TLS protocol has two phases, namely a handshake and a record layer. The handshake is done first and uses public key cryptography in the form of a key agreement, and other aspects such as digital signatures for authentication.

The TLS handshake has an elliptical curve Diffie-Hellman (ECDH) key agreement as an option, and TLS 1.3 requires some form of Diffie-Hellman key agreement, which may be either EDCH or classic DH.

The DH parts of a TLS handshake are asynchronous. For example, a server Alice and client Charlie use the handshake to agree on a master key. The master key is in used to derive session keys which are used in the TLS record layer to protect subsequent content data such as downloaded and uploaded webpages and similar web traffic.

The TLS record layer does not use public key cryptography, so it does not use key agreement, but rather provides a useful application of key agreement.

Semigroups

Semigroups are a category of mathematical objects in algebra. Each semigroup S has a set of elements, and a binary operation defined on the set. The binary operation must be associative. This means that:

$$a(bc)=(ab)c \tag{1}$$

In equation 1 above, a, b and c are in the semigroup S. Equation 1 indicates that when computing the product abc of three elements a, b and c, it does not matter if one multiplies a and b first, getting some value d=ab, and then multiplying d by c to get abc=dc, or if one first multiplies b and c to get a value e=bc and then multiplying a and e to get abc=ae.

Any set equipped with an associative binary operation is a semigroup.

Two examples of semigroup includes positive integers {1,2,3, . . . } under addition, and positive integers {1,2,3, . . . } under multiplication. These two examples share the same set, but have a different binary operation. As will be appreciated by those skilled in the art, there are many other subgroups besides the two defined above.

When discussing a general semigroup S, it is often assumed that the operation is written as multiplication. Furthermore, when a and b are variables represented with values in S, the product is written as ab, omitting any multiplication sign. However, in particular specific semigroups, such as positive integers under addition, a symbol "+" for a binary operation is used and the operation of the written as a+b instead of ab.

In some cases, semigroups S are commutative, which means that which means that ab=ba for all a,b in S. In the example using the positive integer semigroups defined above, both examples are commutative.

Other semigroups are non-commutative. For example, matrices under multiplication would be non-commutative. In that case, in the product abc, the positions of a, b, and c matter for such product. Thus, abc may be different than bac and cab.

However, associativity means that in the product abc, the order in which the two multiplications are carried out does not matter. Thus, either ab or bc could be computed first, but the final result is the same.

In accordance with the present disclosure, semigroups have a multiplication operator.

Semigroups are however not required to have a division operator. In some cases, a division operator may be formed, and is written as "/". A division operator is a binary operator having left and right input. If/is a binary operator on semigroup S, / may be defined as a strong divider if:

$$(ab)/b=a \tag{2}$$

Where equation 2 above is valid for all a,b in S.

The operator / may be defined as a partial strong divider if equation 2 above only holds for a subset of a,b values within S.

In semigroup nomenclature, the operation is generally written as ab/b instead of (ab)/b, which means that multiplications are done before divisions.

Further, a weak divider may also be defined for a semigroup. In particular, sometimes a semigroup has multiplication in which ab=db for many different values of d. In this case, there cannot be a strong divider. A "/" is a weak divider if:

$$(ab/b)b=ab \tag{3}$$

In equation 3, the weak divider is defined for all a, b and S.

A partial weak divider utilizes equation 3, but is only valid for a subset of values a, b within S.

In equations 2 and 3 above, the divider / is also called a right divider. Similarly, a binary operation "\" is called a left divider. The operator \ is a strong left divider if b\ba=a. Further, the binary operator \ is a weak left divider if b(b\ba)=ba.

In various semigroups, a divider operation may be known. For example, for positive integers under multiplication, it is the usual Euclidean division algorithm. For positive integers under addition, the division may become subtraction. Dividers are known for some matrix subgroups, where Bareiss elimination can be used.

Further, many of the constructions of a semigroup use a concept known as a semiring. A semiring R has two binary operations, namely addition and multiplication, each forming a semigroup on R. Addition is also commutative. Multiplication is distributed over addition, meaning that a(b+c)=ab+ac and (a+b)c=ac+bc for all a,b,c, in R. A basic example of a semiring includes positive integers under the usual addition and multiplication operations.

Converting a Semigroup into a Key Agreement Scheme

In accordance with the embodiments of the present disclosure, any semigroup may be converted into a key agreement scheme. Indeed, such construction allows for every key agreement scheme to be constructed in this way, including existing schemes such as DH key agreements and SIDH key agreements.

Based on the above, if a secure, post quantum resistant key agreement scheme is possible, it can be created utilizing the methods and systems in accordance with the present disclosure, along with some subgroup.

Figure 2:
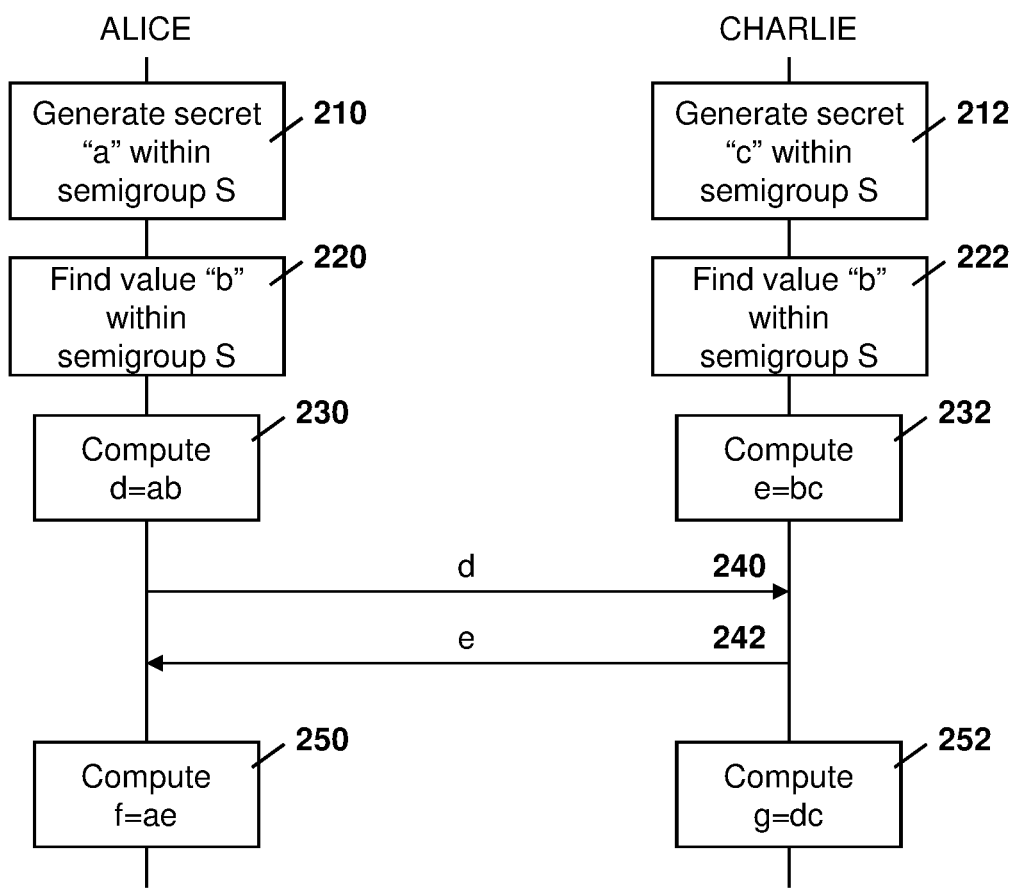
FIG. 2 is dataflow diagram showing a key agreement scheme according to embodiments of the present disclosure.

Reference is now made to FIG. 2. In the embodiment of FIG. 2, two parties wish to create a secret key through a key agreement scheme. In particular, as with FIG. 1, Alice and Charlie communicate with each other.

In accordance with the embodiment of FIG. 2, S is a semigroup. Alice, at block 210, chooses a secret code "a" within the semigroup S.

Similarly, at block 212, Charlie chooses a secret "c" found within the semigroup S.

Further, as seen at block 220 and 222, both Alice and Charlie choose a value "b" found within the semigroup S. The value b can be a public fixed value, or a prearranged secret value such as something derived from a password shared between Alice and Charlie. Other options for determining b are possible. Based on this, the value "b" can be a public value or can be a weak shared secret in some cases.

At block 230 Alice computes a value d=ab. Similarly, at block 232, Charlie computes a value "e" where e=bc.

Thereafter, as seen by message 240, Alice delivers the value "d" to Charlie. Similarly, in message 242, Charlie delivers the value "e" to Alice.

At block 250, Alice computes f=ae. At block 252, Charlie computes g=dc.

Since S is a semigroup, multiplication is associative. Therefore, f=ae=a(bc)=(ab)c=dc=g.

Based on this, both Alice and Charlie compute the same value f=g.

In the embodiment of FIG. 1, the variables a, c, d, e, f and g were used. These variables are similarly used in FIG. 2 to illustrate that the construction is a key agreement scheme.

Comparing the embodiments of FIG. 1 and FIG. 2, the embodiment of FIG. 2 uses the semigroup S. Further, it uses an extra variable b, which is a shared or pre-shared element of S.

In the embodiment of FIG. 2, the value that is shared over the public channel is computed through multiplication. In FIG. 1, it was not specified how the values of d and e were computed from a and c respectively.

Further, the embodiment of FIG. 2 uses semigroup multiplication to compute the shared secret f=g. The embodiment of FIG. 1 did not specify how the shared secrets were computed.

Further, the associativity of the semigroup is used to ensure that f=g. Conversely, in FIG. 1, the algorithm used to compute f and g were not defined to allow that Alice and Charlie could ensure that they agree on the same shared secret.

Using the embodiment of FIG. 2 above, any key agreement scheme can be created. However, the semigroup chosen determines the security of the key agreement scheme.

For example, various paraments of the semigroup may indicate a lack of security. In particular, a semigroup S that is used for key agreement must not have an efficient divider operator. If it did, then an adversary could compute Alice's secret a as a=d/b when b is public or if b is a weak secret such as a password. Once the attacker figures out the secret a, the attacker can copy Alice's computations at block 250 to obtain the shared secret f=ae.

Similarly, no efficient left divider should exist within the semigroup S to avoid security issues.

Other elements to be considered when choosing the secure semigroup S are provided below.

Wedge Problem

Generally when choosing a semigroup, a wedge problem, as defined below, should be hard to solve.

In particular, a ternary operation with three inputs: a left input, a middle input, and a right input is considered in this case. If the three inputs are ab, b, bc, then the output should be abc.

Specifically, each triple (a,b,c) of values in S generates an input (ab), b, bc) to the wedge problem. A goal of an attacker is to find a "wedge operator" that would allow generation of a target output of abc from such inputs. In the present disclosure, the triplet (a,b,c) is called the seat of the problem. Input ab is the left input, the value b is the middle input, and the value bc is the right input.

Many different seeds (a,b,c) could lead to the same input (ab, b, bc). However the value of abc is determined uniquely by the input.

For example, suppose that (a', b', c') leads to the same input, so that (a'b', b', b'c')=(ab, b, bc). In this case abc= (a'b')c=a'(b'c)=a'(b')c=a'(b)c=a'(bc)=a'(b'c')=a'b'c'.

In this regard, the wedge problem is to find an efficient algorithm to implement such function. Without loss of generality, it can be assumed that the algorithm is deterministic, and therefore the algorithm computes an approximation of the true wedge function where the use of the term approximate is in the sense of being correct with some probability. The wedge function is a ternary function.

Because the wedge function exists, the wedge problem is a computational problem. An adversary who uses the wedge problem to attack an associative key agreement scheme merely has to solve the computational problem.

To denote the above, a wedge operator $\wedge$ is defined. Further, the middle input is provided as a lowered subscript to the right of this symbol in accordance with the present disclosure. For example, equation 4 below provides such wedge operation $$d\wedge_b e \quad (4)$$

In Equation 4 above, d is the left input, b is the middle input and e is the right input.

It should be noted that the $\wedge$ symbol, as used in the present disclosure, should not be confused with the symbol and other names in others of mathematics and computer programming Further, in mathematics, the term "wedge operator" or "wedge product" is often used with various meanings. Most often it is used to be synonymous with a "exterior product". However, again these terms should not be confused with a wedge operator as defined in the present disclosure. Specifically, as used herein, the wedge operator $\wedge_b$ is defined by equation 5 below.

$$ab\wedge_b be = abc \quad (5)$$

Equation 5 holds for all a, b, c in S.

In accordance with the present disclosure, the value b is often fixed, in which case $\wedge_b$ is considered to be a binary operator. If b was chosen as a weak secret, such as a prearranged password, then a dictionary attack may be used to find b.

Further, as used herein, partial wedge operators are defined as those which are successful only for a certain subset of the values of a,b,c in the semigroup S.

Further, in accordance with the present disclosure, we allow wedge function to be defined for input to triplets (d,b,e) which are not of the form (ab,b,bc). These input triples are called irrelevant inputs and the output values are irrelevant. Further, it is not required for a wedge function to identify whether an input is relevant.

Generally, as used herein, the wedge problem is only of interest when the seed (a,b,c) is restricted in some manner. In particular, when a is Alice's secret, c is Charlie's secret and so on. For other values of (a,b,c) we may not mind if the wedge problem is easy to solve. In this case, the corresponding instance of the wedge problem is also irrelevant.

If an adversary can effectively compute a wedge operator $\wedge_b$ in S, then such adversary can break the key agreement scheme built from S. Since the adversary observes the public values d and e, and determines the value b, which can either be a public or a weak secret, the adversary may then compute equation 6 below.

$$d\wedge_b e = ab\wedge_b bc = abc = f \quad (6)$$

From equation 6, one criteria for choosing a semigroup is that the wedge problem is hard to solve. For example, the wedge problem may be implemented using a partial wedge operator for relevant values of the (a,b,c) used in the key agreement.

Certain semigroups can be eliminated from contention based on the such wedge problem. For example, idempotent semigroups (also known as bands) may be eliminated. An element b is idempotent if bb=b. An idempotent semigroup, by definition, has all elements idempotent, including input b to the wedge problem. In this case, multiplication can serve as the binary version of the wedge operator.

Further, polarized semigroups may also be eliminated. A semigroup is defined to be polarized if abc=ac for all a,b,c. In this case, multiplication provides the wedge operator and thus polarized semigroups should similarly be avoided.

Other examples to eliminate semigroups based on the wedge problem are also possible.

Structurally Secure Semigroups

Typical Diffie-Hellman groups, such as elliptic curves and modular multiplication groups, are cyclic groups, which are known to be isomorphic to modular addition groups. As used herein, isomorphic means that they share the same underlying group structure, even though they have different representations. Modular integer addition groups would be insecure if used as Diffie-Hellman groups since the division problem is easy. Fortunately, finding isomorphism is difficult (except by Shor's quantum computer algorithm), even though it is known to exist.

Accordingly, it can be said that elliptic curve groups and modular multiplication groups are "structurally insecure" as Diffie-Hellman groups, because they share the same structure as insecure Diffie-Hellman groups (modular addition groups). It should be noted by those skilled in the art that just saying a scheme is structurally insecure does not mean that it is insecure. However, such scheme may be suspected to be insecure because the only thing between such scheme and attack is isomorphism, which is known to exist. Such existential threat is commonplace in cryptography, but nonetheless it may be beneficial to find a cryptographic scheme for which there is no known existential threat. Such a scheme would be deemed to be structurally secure.

One specific example of a structurally secure scheme is known as the Vernam cipher, also known as a one-time pad. It has been proven that the confidentiality of such cipher is unconditionally secure. Such a scheme is therefore structurally secure. However, the one-time pad has other security issues (as it does not provide message integrity or authentication) and has practicality issues (that the one-time pad must be equal in size to the message, among other factors).

However, a one-time pad is not a key agreement scheme, but it is structurally secure in the sense above.

In accordance with the present disclosure, structurally secure agreement schemes are sought.

Similarly, a semigroup may be structurally insecure if it has the same structure as the known weak semigroup. Therefore, in accordance with one embodiment of the present disclosure, to avoid structurally insecure semigroups two options are provided. A first is referred to as trial elimination, and the second is referred to as restriction.

Figure 3:
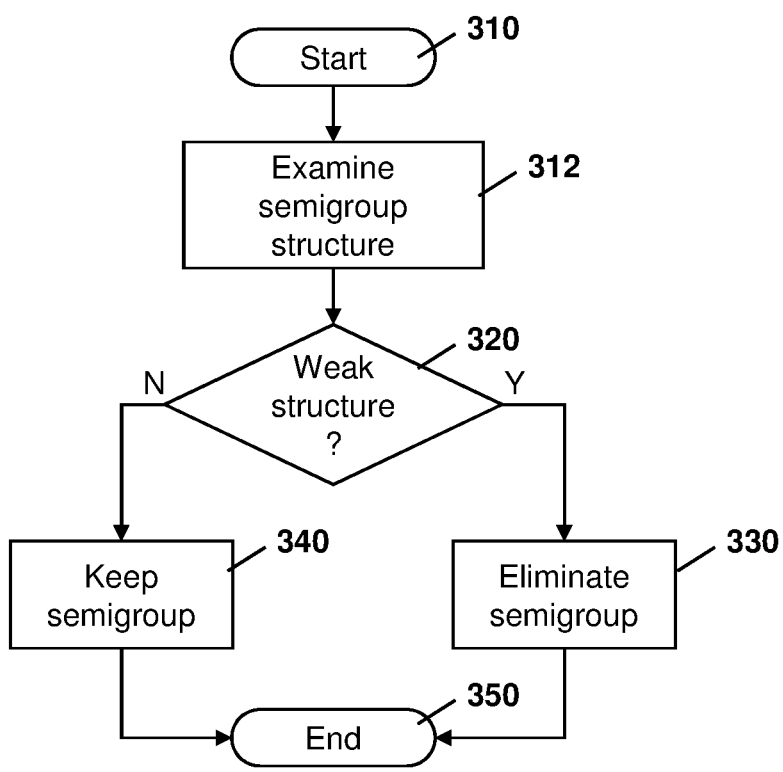
FIG. 3 is a process diagram showing trial elimination of semigroups.

With regard to trial elimination, reference is now made to FIG. 3. In FIG. 3, the process starts at block 310 and proceeds to block 312 in which the structure, up to isomorphism, is examined for a particular semigroup. In many cases, it will be obvious that a weak semigroup of a structure exists. In that case, the semigroup may be eliminated and we may move to another semigroup. Because the semigroups are plentiful and even semigroups with varying structures are plentiful, this process can be continued. In particular, from block 312 the process proceeds to block 320 and determines whether the structure of the semigroup includes a weak semigroup. As used herein, "weak" means that the use of the semigroup in a cryptographic system would permit a computationally feasible attack on the cryptographic system, and thus use of such system would make the cryptographic system computationally vulnerable.

If yes, the process then proceeds to block 330 in which the semigroup is eliminated. The process then proceeds to block 350 and ends.

Rather than moving to block 350, the process may continue from block 330 by selecting a new semigroup to examine and then proceeding back to block 312.

Conversely, at block 320, if it is determined that there are no weak semigroups that are known, then the process may proceed to block 340 in which the semigroup may be kept as a possibility for a key agreement scheme.

Figure 4:
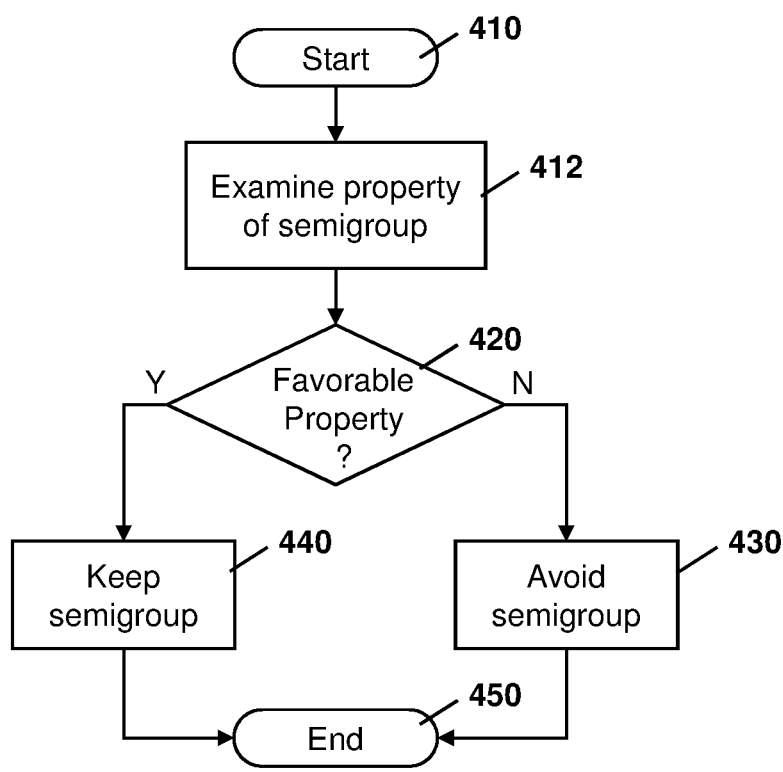
FIG. 4 is a process diagram showing restriction of semigroups.

A second strategy is referred to herein as restriction. In restriction, a property of the semigroup structure may be considered. Reference is now made to FIG. 4.

In particular, the process of FIG. 4 starts at block 410 and proceeds to block 412 in which a property of the semigroup is considered or examined. Specifically, semigroups may have various properties such as, commutativity, where st=ts for all s and t within the semigroup. Another property may be regularity in which, for all s within the semigroup there exists a t with sts=s. Other properties are provided for in Table 1 below.

TABLE 1

Example Semigroup Properties

| Property | Description/comments |
|---|---|
| Finite semigroups | Although every practical key agreement scheme can be constructed from a semigroup, it could be the case the key agreement schemes that are most naturally constructed from an infinite semigroup are more secure |
| Monoid | The presence of a multiplicative neutral (identity) element, often known as 1, makes a few tasks in the semigroup a little easier. But usually, an element 1 can be added into any semigroup. |
| Idempotent | Semigroups with this property are insecure, since (ab)b(bc) = abc. So, non-idempotent semigroups should be sought. |
| Commutative | It would seem like non-commutative semigroups would be more secure |
| Exponential growth | Gromov introduced the idea of polynomial and exponential growth in groups, which can also be applied to semigroups |
| Cancellative | In cancellative semigroups, multiplication is injective. Cancellative semigroups might be more secure, because no information is lost. But they might also be less secure, for the same reason. They are much closer to groups, which means that they might be less post-quantum secure |
| Groups | Groups are a special subset of semigroups. Generally, groups seem to be vulnerable to Shor's postquantum attack algorithm |
| Regular semigroups | These are groups in which each element s has a semigroup inverse, meaning an element t such that sts = s. Regular semigroups are somewhat closer to groups, so might be less post-quantum secure than non-regular semigroups. Also, a semigroup inverse of b can be used to solve the wedge problem, even to solve the weak division problem. So, if a semigroup is regular, it may mean it is easy to find the semigroup inverse (because they always exist). |
| Nilpotent semigroup | a nilpotent semigroup is a semigroup in which every element multiplied by itself enough times results in a value 0. Every key agreement scheme can be constructed from a nilpotent semigroup, but it may be the case that if the most natural semigroup from which a semigroup is constructed is not nilpotent, then the key agreement is more secure |

TABLE 1-continued

Example Semigroup Properties

| Property | Description/comments |
|---|---|
| Fundamental semigroup | A fundamental semigroup cannot be mapped to any other non-isomorphic semigroup (mapped while preserving multiplication) |
| Bisimple semigroup | Also known as a Reilly semigroup |

The list of properties in Table 1 above is not exhaustive. Other properties may also be considered in accordance with the embodiment of FIG. 4.

Based on the properties in Table 1 above, the process may proceed to block 420 in which a determination is made to consider whether the property is favorable to security or not. If the property is not favorable, the process proceeds to block 430 in which all semigroups with that property are avoided for the selection of the semigroup for the key agreement scheme. A property is not favorable to security if such property renders the keys computationally vulnerable to being discovered.

The process then proceeds from block 430 to block 450 and ends. In other embodiments, instead of proceeding to block 450, the process may proceed from block 430 back to block 412 in which a different property may be examined for the semigroup.

Alternatively, if the property is favorable for security then the process may proceed to block 440 in which the semigroup is kept and may again be further analyzed at block 412 with other properties. Alternatively, if the properties that are being examined have all been examined, the process may then select such semigroup as a possibility for a key agreement scheme and the process may proceed to block 450 and end.

Constructed Semigroups

In a further embodiment, semigroups can be constructed using building blocks such as other semigroups, or other types of algebraic objects, such as semirings, and even arbitrary functions. These constructed semigroups can have the same or better security (harder wedge problem) than the individual building blocks.

Thereafter, each semigroup construction can be used to build a key agreement scheme. The semigroup construction can use the same or diverse types of building blocks to form such semigroup.

As used herein, a semiring is a pair of semigroups sharing the sets, with one operation written additively and the other multiplicatively. Further, in a semiring, distributive laws hold. In particular, a(b+c)=ab+ac and (a+b)c=ac+bc. Unless noted otherwise, addition in a semiring is assumed to be commutative.

To avoid confusion, in the embodiments below, constructions from building blocks are distinguished by labelling the building blocks with the adjective "base". For example, if a given semiring is taken as a building block, such as a semiring R of positive integers, then we construct a semiring S of 3×3 square matrices whose entries belong to R. Since both R and S are semirings, to avoid confusion we say that R is the base semiring. In this case, each semiring element (of S) is a matrix whose entries belong to the base semiring R.

Table 2 below provides a partial list of example constructions that can be used to build a semigroup. In many cases, such semigroup may be built from other building blocks, such as other semigroups or sometimes through a semiring.

TABLE 2

Example Constructions

Description/comments

Forming an addition semigroup S of (base) semiring R (using addition of R)
Forming a multiplication semigroup S of a (base) semiring R (using multiplication of R)
Forming a semiring S of matrices from a base semiring R, (using standard matrix addition and multiplication)
Forming a semiring S of polynomials from a base semiring R (using standard polynomial addition and multiplication).
Forming a semiring S consisting of a set of (fractional) ideals in a base ring R (using standard ideal addition and multiplication).
Forming a semiring S from a base semiring R and a base semigroup G, called the semigroup algebra: the elements of S are formal R-combinations of elements G.
Forming a semiring R of endomorphisms of a commutative (additive) base semiring A (using point-wise addition of functions for addition in R, and function-composition for multiplication in R)
Forming a semiring R of bivariate polynomials by using the resultant operation, where addition in R is standard polynomial multiplication, and multiplication in R is the resultant. This is explained further below.
Forming a semigroup S as a direct product of base semigroups T and U (category theory product), so elements of S are pairs (t, u) with t in T and u in U, and multiplication defined as (t, u)(x, y) = (tx, uy).
Forming a semigroup S as a compositum of base semigroups T and U (category theory coproduct). Elements of S are ordered sequences with entries that alternate between members of T and U. In a product, one may concatenate sequences, except if adjacent belong to the same base semigroup, one may multiply them. For example, $(t_1, u_1, t_2)(t_3, u_2) = (t_1, u_1, t_2t_3, u_2)$.
Forming a semigroup S as a disjunction of base semigroups T and U: elements of S are the elements T and elements of a copy of U (disjoint from T), and error element. All products have the result error, unless they belong to the same base semiring, in which case they multiply accordingly.
Forming a semigroup S from a set X, by taking all functions from the set to itself: multiplication in S is composition of functions
Forming a semigroup S from an arbitrary single binary function f, which maps pairs (a, b) to values c, with a, b, c, from sets A, B, C respectively. Form S, taking disjoint copies of the sets A, B, C an error value.

TABLE 2-continued

Example Constructions

Description/comments

Multiplication in S defaults to the error value, except it the operands are some a from A and some b from B, in which the the result is ab = c = f(a, b).
Forming a semigroup R from the set of all relations (or directed graphs) on a set X. A relation r in R is a set of pairs (x, u) with x, y from X. Given two relations r and s, the product relation rs is defined as the set of all pairs (x, z) such that there exists y in X with (x, y) in r and (y, z) in s.

Utilizing the embodiments of Table 2 above, in a direct product of the base semigroups, the resulting semigroup is at least as secure as the strongest base semigroup. This is the strongest link construction.

In other constructions, each construction may boost the security compared to the base objects. Thus, the aim is for security amplification.

In one example, consider a semigroup based on resultants of bivariate polynomials. The semigroup is first described mathematically. The details of using such semigroup in a cryptographic system are then described.

Let Z be the ring of integers. Let Z[x,y] be the set of bivariate polynomials with integer coefficients. Normally, Z[x,y] is treated like a ring R, under polynomial and addition, but here we give Z[x,y] a different semiring structure B. Addition in B, written as +B, is multiplication in R. Multiplication in B, written as *, uses the resultant operation, so (f*g)(x,y)=Rest(f(x,t),g(t,y)).

Now, B is a semiring with non-commutative multiplication. This follows from the well-known theory of resultants. For example, Res(f,gh)=Res(f,g)Res(f,h), proves the distributive law.

In particular, a semigroup S can be formed, with multiplication written *, by using 2 by 2 square matrices with entries in B, and where S multiplication is B-matrix multiplication (using operations in B).

An example of multiplication in S. Let $$a = \frac{(15x^2 + y \quad 4xy + 1)}{(2x + y^2 \quad y - 7)} \tag{7}$$

$$b = \frac{(6xy + 8 \quad x + 11)}{(3x + 2y \quad y^2 + 9)} \tag{8}$$

Then:

$$a*b = \frac{((15x^2+y)*(6xy+8) +_B (4xy+1)*(3x+2y) \quad | \quad (15x^2+y)*(x+11) +_B (4xy+1)*(y^2+9))}{((2x+y^2)*(6xy+8) +_B (y-7)*(3x+2y) \quad | \quad (2x+y^2)*(x+11) +_B (y-7)*(y^2+9))} \tag{9}$$

which equals the matrix:

$$\frac{(Res_t(15x^2+t, 6ty+8) Res_t(4xt+1, 3t+2y) \quad | \quad Res_t(15x^2+t, t+11)Res_t(4xt+1, y^2+9))}{(Res_t(2x+t^2, 6ty+8)Res_t(t-7, 3t+2y) \quad | \quad Res_t(2x+t^2, t+11)Res_t(t-7, y^2+9))} \tag{10}$$

So, now there are eight resultants to compute. One way to compute a resultant is to compute the determinant of the Sylvester matrix.

In this disclosure, the horizontal, ascending version of the Sylvester matrix is defined. The Sylvester matrix is a square matrix with sides length equal to the sum of the degrees in the active variables, in this case variable t. The t coefficients of each input polynomial are arranged horizontally, in ascending order, from the lowest degree term to the highest. Zeros fill the remaining entries of the row. Each polynomial is used in a number of rows matching the degree of the other polynomial. Each use of the polynomial is shifted once to the right, until it reaches the right side of the matrix.

Other arrangements, such as vertical or descending, for the Sylvester matrix are also possible (and sometimes used in textbooks), but they at most change the sign.

For example, $$Res_t(2x+t^2, 6ty+8) = \det \begin{pmatrix} 2x & 0 & 1 \\ 8 & 6y & 0 \\ 0 & 8 & 6y \end{pmatrix} \quad (11)$$

The determinant in this case is $72xy^2+64$. Computing all 8 determinants similarly, one gets that:

$$ab = \left( \begin{vmatrix} (90x^2y-8)(3-8xy) & (15x^2-11)(y^2+9) \\ (72xy^2+65)(-7-2y) & (2x+121)(y^2+9) \end{vmatrix} \right) \quad (12)$$

Finally, one can expand each entry, which are given above as standard polynomial products, into sums, as follows:

$$a*b = \left( \begin{vmatrix} -720x^3y^2+270x^2y+64xy-24 & 15x^2y^2+135x^2-11y^2-99 \\ -144xy^3-504xy^2-130y-455 & 2xy^2+121y^2+18x+1089 \end{vmatrix} \right) \quad (13)$$

For better security, starting polynomials (a and b) should be chosen with higher degrees and larger coefficients. Also, matrices with more rows and columns may be used. It should then be much more difficult to determine a from a*b and b.

The typical known algorithms for matrix division, such as Bareiss reduction, work over matrices with entries in a commutative ring. But here the matrix entries are not commutative, and not even a ring. For example, subtraction is not possible. Perhaps B can be extended to a ring, by introducing formal differences (in a manner similar to how negative integers can be introduced as formal difference of positive integers). But then division and the non-commutativity need to be dealt with. These difficulties may represent a significant hurdle to cryptanalysis.

Those skilled in the art may notice that that a*b was initially obtained in a form whose entries were products of resultants over the entries a and b. If the entries of a*b can be factored, then the factors can try to be matched to the entries of b, and then division in the semiring B be performed, to extract the entries of b.

This attack strategy requires polynomial factorization. Polynomial factorization, for large integer coefficients and high degree polynomials can be difficult for conventional (non-quantum) computers.

A quantum computer may make polynomial factorization easier. However, to address the quantum computer risk, another measure can be used. Ensure the input matrices a and b have entries which are products too. The product a*b matrix entries can still be factored, but now there may be many more factors, and there may not be any easy way to match factors of the a*b entries to those of b.

Table 2 above listed various well-known construction of semi-groups that may be used to build up semigroups (from more base semigroups) with better security.

For Alice and Charlie to use such semigroups, they need to be able to send and represent semigroup elements to each other. So, that means that they must have some means of converting a semigroup element into a sequence of bytes. Such byte representations are commonly used in cryptography. They are used in Rivest-Shamir-Adleman (RSA), Elliptic Curve Cryptography (ECC) and many other systems.

A system for the semigroup based on resultants, which was described mathematically above, is described below.

In some cases, a new byte-encoding scheme may be used for such semigroup. Alternatively, rather the devising an entirely new byte-encoding scheme, in one embodiment some existing byte-encoding scheme that can do two things: encode integers, and encode sequences of other objects, may be used. Abstract Syntax Notation 1 (ASN.1) can do this (or more precisely ASN.1 Basic Encoding Rules can do this). Another encoding systems is Javascript Object Notations (JSON).

In one embodiment, a matrix may be represented as a sequence of its rows. Further, a row may be represented as a sequence of entries. A bivariate polynomial in variables x and y may be represented as a sequence of y coefficients, in order of increasing degree, starting from degree zero, with each coefficient being a univariate polynomial in variable x. (But represent a zero polynomial as an empty sequence.) A univariate polynomial in x may be represented as a sequence of coefficients in ascending degree starting from degree zero, with each coefficient being an integer (and represent a zero polynomial by an empty sequence).

Suppose that a sequence of objects a, b, c is represented as [a,b,c], where each object a,b,c being replaced by its representation. Suppose integers are represented in the usual decimal form.

Consider the example a*b from Equation 13 above. Its representation is: [[[[−24],[0,64,270],[0,0,0,−720]],[[−99,0,135],[ ],[−11,0,15]]],[[[−455],[−130],[0,−504],[0,−144]],[[1089,18],[ ],[121,2]]]].

From these nested sequences and integers, a byte encoding is relatively easy. The most naïve is to just use ASCII text.

As noted above, Alice and Charlie would likely use larger parameters than the shown in the example, in order to achieve better security. So, they would use larger integers, higher-degree polynomials, and matrices with more entries. But they could still use the encoding scheme described above, even they use much larger parameters. Larger parameters do mean that Alice and Charlie must exchange a greater number of bytes.

In addition to the embodiments above using resultants, which describes a new semigroup, and the brief sketch, there are also the semigroups listed in the separate technical and research reports. Again, these various semigroups can be combined into larger semigroups. In some cases, the semigroups involve semirings.

The list below shows, by name, various such semigroups:
- Numerical semigroups
- Groups (the most well-studied subcategory of semigroups)
- Subsemigroups
- Image semigroups
- Restriction semigroups
- Extended semigroups
- Converse semigroups
- Product semigroups (direct products)
- Compositum semigroups (free products)
- Disjunction semigroups
- Rees matrix semigroups
- Polynomial function semigroups
- Monogenic (cyclic) semigroups
- Zero (constant) semigroups
- Left and right semigroups
- Boolean semigroups
- Word semigroups
- Transformation (function) semigroups
- Partial transformation semigroups
- Relation semigroups
- Arbitrary binary operation semigroups
- Semiautomata semigroups
- Semigroups from totally order sets and lattices
- Characteristic semigroup of a semigroup (see [L])
- Semigroup from semirings (addition or multiplication)
- Semirings with left addition, and any semigroup for multiplication
- Semirings with left multiplication, and any idempotent semigroup for addition
- Semiring that is the semigroup algebra (see research report and [0])
- Hahn series, extension of the semigroup algebra, when the semigroup is totally ordered.
- Endomorphism semiring of a semigroup
- Semirings from totally order sets with a selected zero-like set
- Boolean semirings
- Relation semirings
- Semirings from lattices, using meet and join
- Semirings from partially order sets using the incidence algebra
- Semirings with infinite sums, from topologies, using union for addition, intersection for multiplication
- Semigroup of oriented knots, or manifolds, using the connected sum as the semigroup operation
- Semirings with infinite sums, from non-negative real numbers
- Semirings with one point extensions
- Semirings of polynomials
- Semirings of matrices
- Semirings of resultants
- Semiring of category algebras
- Semigroups of objects in a category with products and coproducts
- Rings (the most well-studied subcategory of semirings)
- Weyl algebra
- Integer-value polynomials (a non-Noetherian ring)
- Semiring of ideals of a ring (under ideal addition and multiplication), such as standard polynomial ring
- Semiring of modules of a ring (under direct sum and tensor product)
- Semiring of fractional ideals of a ring
- Semiring of continuous function defined on a unit square using the Fredholm operation for multiplication
- Semigroups with error correction
- Semigroups from near-rings.

Consider the semiring of ideals of a standard polynomial ring. The theory of Groebner bases provides a unique representation of each ideal, in terms of its basis. Otherwise, without unique representation, Alice and Charlie might not be able to agree on the unique form of f and g.

Then addition and multiplication are straightforward: to add just take the union of the bases, and to multiply the ideals just multiply the bases. Then re-normalize the basis using Buchberger's algorithm. This give a semiring, so an additive semigroup and multiplicative semigroup. The additive semigroup is idempotent, so the wedge problem is easy. The multiplicative semigroup has a known efficient division algorithm, the idea quotient algorithm, which is not quite as efficient as the multiplication algorithm. Therefore, this semigroup is probably not suitable for direct use in key agreement.

However, the semiring maybe useful as an intermediate step of a more complicated construction. For example, it can be used as a base semiring in forming matrices, or in forming a semigroup algebra. The fact that strong subtraction in not possible in the semiring of ideals might make a known algorithm such as the Bareiss algorithm for matrix division infeasible.

Figure 5:
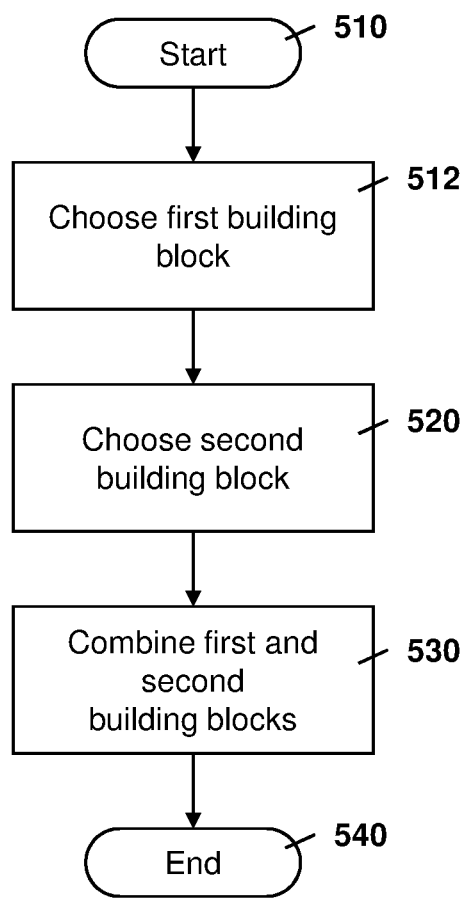
FIG. 5 is a process diagram showing combining of building blocks to create a semigroup.

Based on the above, reference is made to FIG. 5. In particular, the process of FIG. 5 starts at block 510 and proceeds to block 512 in which a first building block is chosen. The chosen building block may be done based on techniques such as those described above with regard to FIG. 3 or 4, for example.

The process then proceeds to block 520 in which a second building block is chosen. Again, the choice of building blocks may be done in various ways, including the functionality described above with regard to FIG. 3 or 4.

From block 520, the process proceeds to block 530 in which the first selected building block from block 512 and the second select building block from 520 are combined. As described above, the combination can be done in a variety of ways to create a constructed semigroup which has the same or better security than the individual building blocks. The process then proceeds to block 540 and ends.

Negotiated Semigroups

In accordance with one embodiment of the present disclosure, Alice and Charlie can try to negotiate their semigroup in real time.

Specifically, due to the various well-known constructions of semigroups, including matrices, polynomials, ideals, semirings, among others, Alice and Charlie have the power to negotiate distinctly unique semigroups for each key agreement session.

Figure 6:
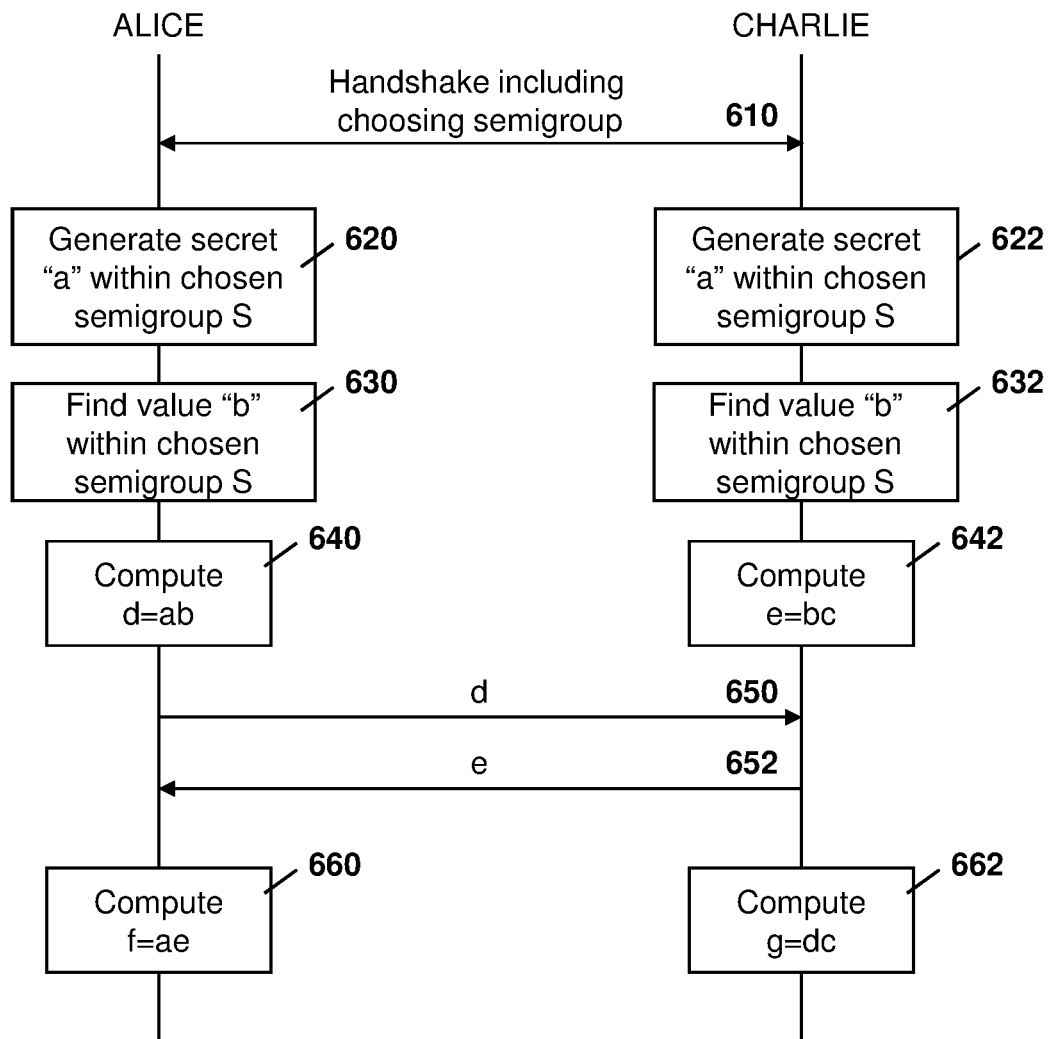
FIG. 6 is a dataflow diagram showing a key agreement scheme according to embodiments of the present disclosure where the semigroup is negotiated.

Reference is now made to FIG. 6. In the embodiment of FIG. 6, Alice and Charlie are trying to negotiate a key agreement. In this case, prior to the key agreement, a handshaking 610 is performed between Alice and Charlie. Handshaking 610 allows for a negotiation mechanism which allows a semigroup to be agreed upon between Alice and Charlie.

For example, if the negotiation allows for very many semigroups, then this could provide for a versatile key agreement scheme. The negotiation could use data formats to describe the various constructions, for example defined in regard to the embodiment of FIG. 5 above.

The negotiation could also have a "request phase", where parties indicate to each that they request semigroups with some of the properties listed above with regard to the embodiments of FIGS. 3 and 4.

To make the handshake 610 practical, Alice and Charlie may need a mechanism to specify semigroups and their elements. For example, data structures such as the JavaScript Object Notation (JSON) might be useful for providing such specification. However, this is merely an example, and other examples of data structures are possible.

Thus, Alice and Charlie, as part of the key agreement, can choose a semigroup S from a plurality of semigroups.

After the handshaking agreement on the semigroup to be used, the process proceeds in a manner similar to that described above with regard to FIG. 2. In particular, Alice, at block 620, generates a secret "a" within the agreed-upon semigroup. Similarly, at block 622, Charlie generates a secret "c" within the agreed-upon semigroup.

A value "b" may be part of the semigroup and in one embodiment may be included within the handshaking 610. The value may, conversely, be agreed upon through other mechanisms. In the embodiment of FIG. 6, the obtaining of value "b" is shown in block 630 for Alice and 632 for Charlie.

Next, at block 640, Alice multiplies her secret "a" with the value b to obtain d.

Similarly, at block 642, Charlie computes e equals the value b times the value c.

Subsequently, Alice provides "d" to Charlie, as shown with message 650. Similarly, Charlie provides the value "e" to Alice, shown by message 652.

Alice may then, at block 660, calculate f=ae.

Charlie may, at block 662, calculate g=dc.

Due to the associative nature of the semigroup, f=g. Therefore, Alice and Charlie have a shared secret within the negotiated semigroup.

If an adversary does not have a sufficiently reprogrammable quantum computer, then the adversary will need to build a new quantum computer to attack each key agreement session, which will make such task hard. In this situation, a multitude of users receive protection by numbers, since the attacker will only be able to attack a few of such users. Thus, the negotiation of the semigroup from many semigroups adds security and may foil the quantum attack.

Further, the use of negotiation for the semigroup allows for cryptoagility. In particular, if one semigroup is found to be vulnerable, such semigroup can be excluded from future negotiations and will therefore still permit the system to work for the remaining semigroups.

The above methods may be implemented using any computing device. One simplified diagram of a computing device is shown with regard to FIG. 7. The computing device of FIG. 7 could be any fixed or mobile computing device.

Figure 7:
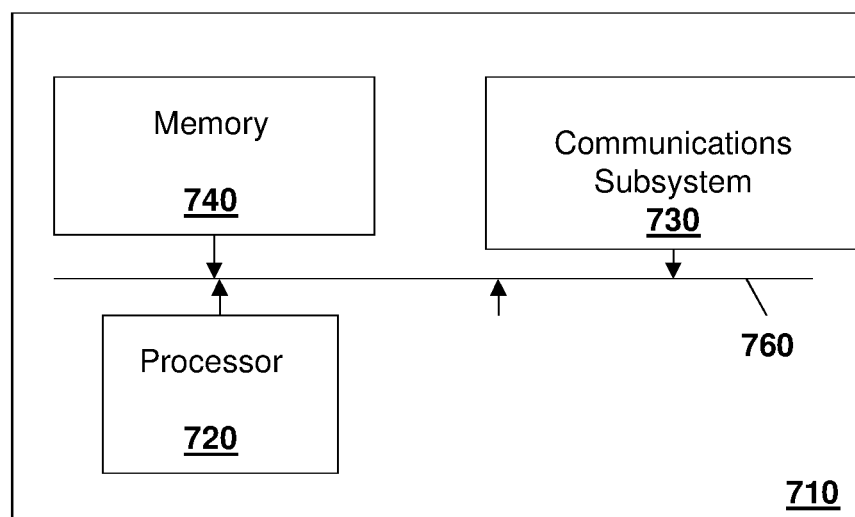
FIG. 7 is a block diagram of a simplified computing device capable of being used with the embodiments of the present disclosure.

In FIG. 7, device 710 includes a processor 720 and a communications subsystem 730, where the processor 720 and communications subsystem 730 cooperate to perform the methods of the embodiments described above. Communications subsystem 730 may, in some embodiments, comprise multiple subsystems, for example for different radio technologies.

Processor 720 is configured to execute programmable logic, which may be stored, along with data, on device 710, and shown in the example of FIG. 7 as memory 740. Memory 740 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 740, device 710 may access data or programmable logic from an external storage medium, for example through communications subsystem 730.

Communications subsystem 730 allows device 710 to communicate with other devices or network elements and may vary based on the type of communication being performed. Further, communications subsystem 730 may comprise a plurality of communications technologies, including any wired or wireless communications technology.

Communications between the various elements of device 710 may be through an internal bus 760 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method for key agreement between a first party and a second party over a public communications channel, the method comprising:
   selecting, by the first party, from a semigroup constructed from a combination of at least two building blocks, a first value "a";
   multiplying the first value "a" by a second value "b" to create a third value "d", the second value "b" being selected from the semigroup;
   sending the third value "d" to the second party;
   receiving, from the second party, a fourth value "e", the fourth value comprising the second value "b" multiplied by a fifth value "c" selected by the second party from the semigroup; and
   creating a shared secret by multiplying the first value "a" with the fourth value "e",
   wherein the shared secret matches the third value "d" multiplied by the fifth value "c".

2. The method of claim 1, wherein the semigroup is chosen to have a wedge problem that is computationally infeasible to solve, the wedge problem comprising finding an operator $\hat{}_b$ such that:

$$ab\hat{}_b bc = abc.$$

3. The method of claim 1, wherein the semigroup is chosen based on trial elimination, in which semigroups having a cryptographic structure that is computationally vulnerable are eliminated from being chosen.

4. The method of claim 1, wherein the semigroup is chosen based on restriction, wherein restriction comprises:
   examining at least one property of the semigroup; and
   removing the semigroup from being chosen if the property is computationally vulnerable.

5. The method of claim 4, wherein the properties comprise at least one property selected from a list of properties including: finite semigroups, monoid semigroups, idempotent semigroups, commutative semigroups, exponential growth semigroups, cancellative semigroups, groups, regular semigroups, nilpotent semigroups, fundamental semigroups, or bisimple semigroups.

6. The method of claim 1, further comprising communicating between the first party and the second party, a digital message encrypted with a key derived from the shared secret.

7. The method of claim 1, wherein the each building block is selected from a listing including: numerical semigroups, groups, subsemigroups, image semigroups, restriction semigroups, extended semigroups, converse semigroups, product semigroups, compusitum semigroups, disjunctions semigroups, Rees matrix semigroups, polynomial function semigroups, monogenic semigroups, zero semigroups, left and right semigroups, Boolean semigroups, word semigroups, transformation semigroups, partial transformation semigroups, relation semigroups, arbitrary binary operation semigroups, semiautomata semigroups, semigroups from totally order sets and lattices, characteristic semigroup of a semigroup, semigroup from semirings, semirings with left addition and semigroup for multiplication, semirings with left multiplication and any idempotent semigroup for addition, semiring that is the semigroup algebra, Hahn series, extension of the semigroup algebra when the semigroup is totally ordered, Endomorphism semiring of a semigroup, Semirings from totally order sets with a selected zero-like set, Boolean semirings, Relation semirings, Semirings from lattices using meet and join, Semirings from partially order sets using the incidence algebra, Semirings with infinite sums from topologies using union for addition and intersection for multiplication, Semigroup of oriented knots or manifolds using the connected sum as the semigroup operation, Semirings with infinite sums from non-negative real numbers, Semirings with one point extensions, Semirings of polynomials, Semirings of matrices, Semirings of resultants, Semiring of category algebras, Semigroups of objects in a category with products and coproducts, Rings, Weyl algebra, Integer-value polynomials, Semiring of ideals of a ring such as standard polynomial ring, Semiring of modules of a ring under direct sum and tensor product, Semiring of fractional ideals of a ring, Semiring of continuous function defined on a unit square using the Fredholm operation for multiplication, Semigroups with error correction, or Semigroups from near-rings.

8. The method of claim 1, wherein the semigroup is chosen based on a combination using a resultant operation.

9. The method of claim 1, wherein the semigroup is negotiated during a handshaking between the first party and the second party.

10. The method of claim 9, wherein the negotiated semigroup is one of a plurality of available semigroups.

11. A computing device configured for key agreement between a first party and a second party over a public communications channel, the computing device comprising:
a processor; and
a communications subsystem,
wherein the computing device is configured to:
  select, from a semigroup constructed from a combination of at least two building blocks, a first value "a";
  multiply the first value "a" by a second value "b" to create a third value "d", the second value "b" being selected from the semigroup;
  send the third value "d" to the second party;
  receive, from the second party, a fourth value "e", the fourth value comprising the second value "b" multiplied by a fifth value "c" selected by the second party from the semigroup; and
  create a shared secret by multiplying the first value "a" with the fourth value "e",
wherein the shared secret matches the third value "d" multiplied by the fifth value "c".

12. The computing device of claim 11, wherein the semigroup is chosen to have a wedge problem that is computationally infeasible to solve, the wedge problem comprising finding an operator $\hat{}_b$ such that:

$$ab\hat{}_bbc=abc.$$

13. The computing device of claim 11, wherein the computing device is configured to choose the semigroup based on trial elimination, in which semigroups having a cryptographic structure that is computationally vulnerable are eliminated from being chosen.

14. The computing device of claim 11, wherein the computing device is configured to choose the semigroup based on restriction, wherein restriction comprises:
  examining at least one property of the semigroup; and
  removing the semigroup from being chosen if the property is computationally vulnerable.

15. The computing device of claim 14, wherein the properties comprise at least one property selected from a list of properties including: finite semigroups, monoid semigroups, idempotent semigroups, commutative semigroups, exponential growth semigroups, cancellative semigroups, groups, regular semigroups, nilpotent semigroups, fundamental semigroups, or bisimple semigroups.

16. The computing device of claim 11, wherein the computing device is configured to communicate with the second party, a digital message encrypted with a key derived from the shared secret.

17. The computing device of claim 11, wherein the each building block is selected from a listing including: numerical semigroups, groups, subsemigroups, image semigroups, restriction semigroups, extended semigroups, converse semigroups, product semigroups, compusitum semigroups, disjunctions semigroups, Rees matrix semigroups, polynomial function semigroups, monogenic semigroups, zero semigroups, left and right semigroups, Boolean semigroups, word semigroups, transformation semigroups, partial transformation semigroups, relation semigroups, arbitrary binary operation semigroups, semiautomata semigroups, semigroups from totally order sets and lattices, characteristic semigroup of a semigroup, semigroup from semirings, semirings with left addition and semigroup for multiplication, semirings with left multiplication and any idempotent semigroup for addition, semiring that is the semigroup algebra, Hahn series, extension of the semigroup algebra when the semigroup is totally ordered, Endomorphism semiring of a semigroup, Semirings from totally order sets with a selected zero-like set, Boolean semirings, Relation semirings, Semirings from lattices using meet and join, Semirings from partially order sets using the incidence algebra, Semirings with infinite sums from topologies using union for addition and intersection for multiplication, Semigroup of oriented knots or manifolds using the connected sum as the semigroup operation, Semirings with infinite sums from non-negative real numbers, Semirings with one point extensions, Semirings of polynomials, Semirings of matrices, Semirings of resultants, Semiring of category algebras, Semigroups of objects in a category with products and coproducts, Rings, Weyl algebra, Integer-value polynomials, Semiring of ideals of a ring such as standard polynomial ring, Semiring of modules of a ring under direct sum and tensor product, Semiring of fractional ideals of a ring, Semiring of continuous function defined on a unit square using the Fredholm operation for multiplication, Semigroups with error correction, or Semigroups from near-rings.

18. The computing device of claim 11, wherein the computing device is configured to choose the semigroup based on a combination using a resultant operation.

19. The computing device of claim 11, wherein the semigroup is negotiated during a handshaking between the first party and the second party.

20. The computing device of claim 19, wherein the negotiated semigroup is one of a plurality of available semigroups.

21. A non-transitory computer readable medium for storing instruction code for key agreement between a first party and a second party over a public communications channel, the instruction code, when executed by a processor of a computing device cause the computing device to:
  select, from a semigroup constructed from a combination of at least two building blocks, a first value "a";
  multiply the first value "a" by a second value "b" to create a third value "d", the second value "b" being selected from the semigroup;
  send the third value "d" to the second party;
  receive, from the second party, a fourth value "e", the fourth value comprising the second value "b" multiplied by a fifth value "c" selected by the second party from the semigroup; and
  create a shared secret by multiplying the first value "a" with the fourth value "e",
wherein the shared secret matches the third value "d" multiplied by the fifth value "c".

* * * * *